United States Patent [19]
Wick

[11] Patent Number: 5,385,769
[45] Date of Patent: Jan. 31, 1995

[54] MICROPATTERN-EMBOSSED ORIENTED ELASTOMER FILMS

[75] Inventor: Richard J. Wick, Ingleside, Ill.

[73] Assignee: Exxon Chemical Patents Inc., Linden, N.J.

[21] Appl. No.: 65,038

[22] Filed: Aug. 7, 1992

Related U.S. Application Data

[62] Division of Ser. No. 637,359, Jan. 4, 1991, Pat. No. 5,182,069.

[51] Int. Cl.$^6$ .............................................. B32B 3/00
[52] U.S. Cl. .................................. 428/141; 428/156; 428/172; 428/220; 428/332; 428/338; 428/339; 428/910
[58] Field of Search ............... 428/156, 172, 910, 167, 428/141, 147, 179, 212, 215, 220, 332, 338, 339, 409, 515

[56] References Cited

U.S. PATENT DOCUMENTS 4,376,147  3/1983  Byrne et al. ............... 428/167
4,518,643  5/1985  Francis ....................... 428/131

*Primary Examiner*—Donald J. Loney
*Attorney, Agent, or Firm*—T. D. Simmoms; D. W. Miller

[57] ABSTRACT

Elastomer film is extruded or coextruded against an engraved geometric micropattern roll which forms a geometric pattern of raised intersecting ridges or ribs on the film surface, and subsequently oriented in one or both directions to produce a heat-shrinkable, elastic film which retains its geometric micropattern embossment to an unexpectedly high degree, and which therefore has excellent non-blocking properties, reduced gloss and a satin appearance and feel.

8 Claims, No Drawings

MICROPATTERN-EMBOSSED ORIENTED ELASTOMER FILMS

This is a divisional of copending application(s) Ser. No. 07/637,359 filed on Jan. 4, 1991, now U.S. Pat. No. 5,182,069.

OF THE INVENTION

1. Field of the Invention

The present invention relates to improved elastomer films, particularly heat-shrinkable films, which are used for a variety purposes including the formation elastic waistband portions of disposable diapers.

2. Discussion of Prior Art

Diapers are produced from a variety of different plastic films which are used to form different portions of the diaper. The films used to form the main portions, or backsheets of the diaper are inexpensive non-elastomer thermoplastic films such as olefin homopolymers. Such thermoplastic films conventionally are embossed during extrusion, but are not oriented, elastomeric or heat-shrinkable. Reference is made to U.S. Pat. Nos. 4,436,520 and 4,668,463 for their disclosure of embossing such films during extrusion.

Elastomer films are used to form small areas of disposable diapers, i.e., areas such as waistbands and leg-bands, where elastic properties are advantageous to improve the fit of the diaper. Such films generally are oriented or stretched to impart the desired degree of heat-shrinkability thereto so that shrinking occurs upon heat application.

Elastomer films generally present high blocking problems since they contain adhesive polymers such as ethylene-vinyl acetate (EVA) and/or rubbers and oily plasticizers. Therefore it is known to extrude such films against sandblasted embossing rolls to form a random micropattern embossment on a surface thereof to reduce the blocking tendencies of the film, whereby it can be rolled or fed more easily to the tentering station for orienting or stretching in the machine direction (MD) and/or transverse direction (TD). However, the orientation draws down and substantially reduces the random surface embossment so that normal high blocking properties reappear. The high blocking properties make it difficult to handle the film downstream of the tentering station, and most difficult to unwind the elastomer film after it has been collected on a roll.

It is known from U.S. Pat. No. 4,848,564 to extrusion-emboss thermoplastic films such as polyethylene, and elastomeric films such as copolymers of ethylene and vinyl acetate (EVA) or other co-monomers, using either a sandblasted or random micro-roughened embossing roll, or an embossing roll having its surface engraved with a geometric micro pattern having an embossed depth from 0.0005" to 0 0025", such geometric-embossed rolls being described in U.S. Pat. No. 4,367,147.

The films of Pat. No. 4,848,564 are embossed in order to improve their non-blocking or release properties with respect to rubber bales on which they are used as wrappers. The embossed films of the patent are not oriented or stretched.

SUMMARY OF THE INVENTION

The present invention relates to the discovery of a novel process for producing embossed and oriented, heat-shrinkable elastomer films suitable for use in diaper waistbands and other elastic structures in which the processing and handling of the films is simplified and the necessity of feeding a normally-blocking or adhesive film through a post-embossing station is avoided.

The present invention relates to a process for orienting heat-shrinkable elastomer films which have been pre-embossed with a geometric micropattern of particular dimensions which imparts properties of reduced surface gloss, excellent feel and non-blocking to the film, which properties facilitate the handling of the film through an orientation station(s) and other downstream stations, and are retained to an unexpectedly high degree after orientation of the film in one or both directions.

The process of the present invention involves the step of producing embossed and oriented heat-shrinkable elastomer films, in which the elastomer film is extruded against or onto an engraved chill roll having a fine geometric micropattern of predetermined dimensions, to produce an embossed elastomer film having low surface gloss, good feel and excellent handling properties due to the resistance of the embossed surface to block or adhere to other surfaces.

The latter property facilitates the subsequent steps of feeding of the embossed elastomeric film into the tentering or orienting station(s), and over bow rolls for flattening the web for collection on a roll, and subsequent unwinding of the roll for final processing, which is the most important advantage.

The most critical feature of the present invention resides in the use of an extrusion-embossment means comprising a geometrically-engraved male or female micropattern surface having from about 50 to 350, preferably a male micropattern having about 100 to 250, most preferably about 165, repeating geometric units or lines per inch, measured in the transverse direction (TD) and/or machine direction (MD). The male micropattern is formed by intersecting embossed or engraved lines, in the number stated above, each line having a depth within the range of 0.001" to 0.0025", most preferably about 0.0018" or 18 ten thousandths of an inch.

DETAILED DESCRIPTION OF THE INVENTION

The elastomeric films suitable for processing according to the present invention include all thermoplastic elastomers or rubbery thermoplastics, including blends of a thermoplastic material and an elastomer which are processable as a melt, at elevated temperatures, and exhibit properties similar to vulcanized elastomers at room temperature.

The preferred thermoplastic elastomer film compositions for use according to the present invention comprise three main components, (1) olefinic elastomer, (2) ethylene copolymer and (3) a hydrocarbon process oil.

The concentrations of the three main components of the blend are as follows:

| Component | Concentration | Preferred Concentration | Most Preferred |
| --- | --- | --- | --- |
| Olefinic Elastomer | 10–40 wt % | 15–30 wt % | 20–30 wt % |
| Ethylene Copolymer | 40–90 wt % | 50–80 wt % | 60–75 wt % |
| Process Oil | 0–15 wt % | 2–12 wt % | 4–10 wt % |

The above concentration ranges may be combined in any permissible combination, although particular combinations are shown as preferred and most preferred.

Elastomer Component: The olefinic elastomer component of the composition preferably comprises an ethylene copolymer elastomer, such as a copolymer of ethylene with higher alpha-olefin. Preferred ethylene elastomer copolymers include EPM (ASTM D-1418-72a designation for an ethylene-propylene elastomer copolymer) or EPDM (ASTM D-1418-72a designation for an ethylene-propylene diene elastomer terpolymer). Also usable are high molecular weight polyisobutylene, butyl rubbers and halogenated butyl rubbers.

Preferred ethylene elastomer copolymers for use herein comprise from 30 to 90 percent ethylene, more preferably from 35 to 80 weight percent ethylene, and most preferably from 50 to 80 weight percent ethylene and have a Mooney viscosity 40–60 (ML 1+4 at 257° F.).

EPDM is a terpolymer of ethylene, a higher alpha-olefin such as propylene, and a non conjugated diene. In such elastomers, the nonconjugated diolefin may be straight chain, branched chain or cyclic hydrocarbon diolefins having from 6 to 15 carbon atoms.

Of the nonconjugated dienes typically used to prepare these copolymers, preferred are dicyclopentadiene, 1,4-hexadiene, 5-methylene-2-norbornene and 5-ethylidene-2-norbornene; 5-ethylidene-2-norbornene (ENB) and 1, 4-hexadiene are particularly preferred diolefins. EPDM elastomers and their method of manufacture are well known to those skilled in the art. Oil extended EPDM elastomers may also be used. Preferred EPDM elastomers contain from 30 to 90 weight percent ethylene, and from 0.5 to 15 weight percent of the nonconjugated diolefin.

As mentioned above, the olefinic elastomer useful in this invention may also be polyisobutylene, a copolymer of isobutylene and isoprene (generally known as butyl rubber) or a halogenated copolymer of isobutylene and isoprene (generally known as halogenated butyl rubber, such as chlorinated, brominated and chlorobrominated butyl rubber). Butyl rubber is vulcanizable rubber copolymer containing from 85 to 99.5 percent combined isolefin having from 4 to 8 carbon atoms and from 0.5 to 15 percent combined conjugated diolefin having from 4 to 8 carbon atoms. Such copolymers and their preparation are well known, and generally the isoolefin is a compound such as isobutylene and the diolefin is compound such as butadiene or isoprene. Halogenated butyl rubbers are also well known: chlorinated and brominated butyl rubber generally contains from 1.0 to 3.0 weight percent bromine and from 0.05 to 0.5 weight percent chlorine.

Ethylene Copolymer Component: The ethylene copolymers include those of ethylene and alpha-olefins having 3 to 16 carbon atoms such as propylene or 1-butene. Also included are copolymers of ethylene with an unsaturated carboxylic acid. In particular, copolymers of ethylene with vinyl acetate (EVA), or with acrylic acid (EAA), or methacrylic acid (EMA), are preferred. The ethylene copolymers to be employed generally contain from 50 to 99 weight percent ethylene, most preferrably from 60 to 95 percent ethylene.

The most preferred ethylene copolymer useful in the present invention is EVA. The EVA may have a vinyl acetate (VA) content between about 9% and 40% by weight, with about 15 to 35 weight percent VA being preferred.

VA contents below about 9 wt % do not possess sufficient flexibility and orientability for purposes of the present invention and VA contents above 40 wt% exhibit excessive tackiness. The best balance of orientability and non-tackiness occurs at the VA contents between 15 and 35 wt%.

Preferred Melt Index (ASTM-D-1238, Condition E) for EVA is from 1 to 20, with 2 to 10 being most preferred.

The ethylene copolymer component normally will determine the operating temperatures of the tentering and annealing operations. These operations may be carried out at temperatures not less than 100° F. and below the crystalline melting point of the ethylene copolymer component. The crystalline melting point of EVA ranges from approximately 105° F. and 200° F., depending on the VA content and MI, with the preferred EVA's having crystalline melting points between about 130° F. and 160° F. For economic reasons, orienting temperatures of 160° F. and below are preferred.

Process Oil Component: Hydrocarbon oils useful in the present invention function as process aids whose activity is enhanced in the presence of vinyl acetate copolymers, as plasticizers producing low modulus and enhanced elasticity in the solid state. Useful oils are the normally liquid hydrocarbon processing and extender oils (ASTM D 2226) categorized as aromatic, highly aromatic, naphthenic and paraffinic process oils of a medium viscosity range. Oils sold under the trademarks "Flexon" and "Arco Prime" have been found especially useful.

Other Additives: The composition may also include pigments, a filler material, an antiblock agent, processing aids, stabilizers and other conventional additives.

FILM PREPARATION

Resin/Blend Preparation: Preparation of compositions usable in this invention can be achieved in several different ways. The various components may be brought into intimate contact by, for example, dry blending the components and additives and then passing the overall composition through a compounding extruder. Alternatively, the components may be fed directly to a mixing device such as a compounding extruder, high shear continuous mixer, two roll mill or an internal mixer such as a Banbury mixer. The optional ingredients previously described can be added to the composition during this mixing operation. Overall, the objective is to obtain a uniform dispersion of all ingredients and this is readily achieved by inducing sufficient shear and heat to cause the plastics component(s) to melt. However, time and temperature of mixing should be controlled as is normally done by one skilled in the art so as to avoid molecular weight degradation.

Film Extrusion: Film from the resin compound is manufactured by conventional cast extrusion. The molten resin is extruded from a coathanger die in the form of a web which is then cast onto a geometrically-etched, micropatterned, embossing chill roller, which solidifies the polymer. The embossed web is moved directly into the tentering station for orientation.

The extrusion temperatures, die temperatures, and chill roll temperatures will depend on the composition employed, but generally will be in the following ranges for the compositions of the present invention prepared by cast extrusion:

| Melt Temperature (°F.) | 350–450 |
| Die Temperature (°F.) | 350–450 |
| Chill Roll Temperature (°F.) | 70–130 |

The process described above may include one or two embossing rolls to chill and emboss the film on one or both surfaces.

In practice, the process of the present invention is carried out using an in-line operation wherein the extruder and orientation system (e.g., tenter) are arranged in tandem to form the film by casting or melt embossing followed by film orientation.

In a preferred embodiment, the compounded extrudable composition containing the elastomer ingredients along with the other additives is introduced into an extruder and extruded into a web from a flat die and melt-embossed through counter rotating chill and embossing rolls. The film thickness may vary from 50 to 400 microns before orientation. Preferably the film will have a final stabilized thickness of between 10 and 100 microns after orientation and annealing.

Since some thermoplastic elastomeric films are quite tacky and present blocking problems which make them difficult to handle and feed, such as the preferred elastomers discussed above, it is preferable to co-extrude such elastomers as a core layer between surface or cap layers of thermoplastic elastomers having reduced blocking properties, generally due to a lower content of adhesive vinyl acetate in the ethylene-vinyl acetate (EVA) component and the absence of the process oil component.

It is important that the surface layer(s) be sufficiently elastic and thin to avoid interference with the higher shrink and elastic properties of the thermoplastic elastomer.

As formed on the core or base layer, each of the surface layer(s) will comprise between 2 to 15, preferably 2 to 10 weight percent of the composite and not more than 25 microns thick. Following the orientation, the surface layer(s) will be reduced to a thickness of not more than 7 microns and as thin as possible. Preferred thickness after orientation is between 1 and 5 microns.

The surface layer may be coextruded onto only one side of the core layer but preferably is extruded onto both sides.

The critical extrusion-embossment step is accomplished by extruding the thermoplastic elasomer layer, or co-extruding an AB or ABA structure of a core layer B having exceptional elasticity and heat-shrink properties, and one or more surface or cap layers A of thermoplastic elastomeric composition having lower tack and lower blocking properties than the core layer. The extruded layer or coextrudate is passed in the form of a continuous molten web in the nip between the geometrically-engraved micropattern surface of a chilled embossing roll and a support roll which is coated with rubber, silicone or other release surface, or between two similar chilled embossing rolls.

After embossment, the film is moved to an in-line tenter or orienting device. Orientation of the film may be carried out in the machine direction (MD) or the transverse direction (TD) or both directions (biaxially) using conventional equipment and processes.

For orientation in the MD, the embossed film at an elevated temperature (but below the crystalline melting point of the polymer) is passed around two rollers driven at different surface speeds, over a pair of bow rolls to flatten the film, and finally to a takeup roller. The driven roller closest to the takeup roll is driven faster than the driven roller closest to the feed roll, such that the film is stretched between the driven rollers. The assembly may include a roller intermediate the second roller and takeup roller to further cool the film. If supplementary cooling is not used, the film will cool to ambient temperature on the take up roll.

The degree of stretch, generally between 50% and 500%, will depend upon the relative peripheral speeds of the driven rollers and the distance between the rollers. Stretch rates of 50 to 500 percent/minute will be satisfactory for most MD orientation applications.

Preferably, however, film orientation is carried out in a tentering device to impart TD orientation to the film. The film is extrusion embossed as described above and then gripped by the edges for processing through the orientation steps. The film is passed successively through a preheat step, a stretching step at elevated temperatures (e.g. from 100° F. to a temperature slightly below the crystalline melting point of the ethylene copolymer), an annealing step, and finally a cooling step. (Although cooling may be considered part of the annealing step, for convenience it is described as a separate step herein.) The preheat, orientation, and a portion of the annealing temperature is controlled at an elevated temperature but below the crystalline melting point of the polymer. Although not essential, it is preferred that tension be maintained on the film during the annealing and cooling steps to prevent sag and to minimize shrinkback. Upon cooling to ambient temperature (i.e., room temperature) or near ambient, the holding force may be released. The film may contract somewhat (snapback) in the TD but will retain a substantial portion of its stretched width.

The tenter operating conditions can vary within relatively wide ranges and will depend on the several variables including film composition, film thickness, degree of orientation desired, annealing conditions, etc. The following is exemplary of a process for stretching 100 micron thick ABA coextruded film (containing EVA) from 43 inches wide to a final width of about 88 inches, using a tenter manufactured by Marshall and Williams Company of Providence, R.I.

| | ESTIMATED FILM RANGE | | | |
|---|---|---|---|---|
| Step | Broad | Preferred | Typical | Approximate Time (Sec.) |
| Preheat | 100–160 F | 130–160 F | 155 F | 3.0 |
| Stretching | 100–160 F | 115–145 F | 135 F | 9.0 |
| Annealing | 100–160 F | 110–140 F | 120–130 F | 3.0 |
| Cooling | Ambient | Ambient | Ambient | 6.0 |

As indicated earlier, it is highly desirable to employ an annealing step in the process. Annealing partially relieves the internal stress in the stretched film and dimensionally stabilizes the film for storage. It has been found that by annealing the film at a temperature of +40° F., preferably +20° F. of the orientation temperature (but slightly below the crystalline melting point of the ethylene copolymer), eliminates undesirable shrinkage during storage. The preferred annealing temperature is between 110° F. and 140° F. Temperatures which result in excessive stress relieving should be avoided, since substantial frozen-in stresses and strains should remain after the process is completed.

Annealing can be accomplished by maintaining the film in the nearly-completely stretched condition at the annealing temperature. Preferably, the annealing and cooling is carried out while permitting the film to contract slightly, but still under stress. The guide rails of the tenter can be arranged in a converging manner to provide the annealing and cooling while the film contracts. The controlled shrinkback of from 5 to 30%, preferably between 10 and 25%, of the maximum stretched width has given particularly good results in eliminating storage shrinkage. This annealing and preshrinking removes some of the film stresses and strains so that shrinkage will not occur at storage temperature. However, the annealing and cooling does not remove all the frozen-in stress and strain, since upon heating to elevated temperatures above storage temperature the film will shrink.

The degree of stretching may vary within wide ranges. Draw ratios of 1.3:1 to 6:1 are possible with 2:1 to 4:1 being preferred for TD tentering. Orientation in the transverse direction only, and to an extent of between 200% and 400%, is preferred.

Films produced according to the simplified in-line extrusion-embossment and orientation process of the present invention retain to an unexpectedly high degree the aesthetic and functional properties imparted during the geometric embossing step, i.e., a micropattern matte surface which has the appearance and feel of satin and which has excellent non-blocking properties which facilitate the unwinding of the film from a roll and substantially improve the handling properties of the film for final processing into diaper waistbands and/or other stretchable components or products.

These results are obtained through the use of the geometric micropattern-engraved embossing rolls identified herein, having the stated number of intersecting lines or cut valleys per inch, each having a depth between about 0.001 and 0.0025 inch, forming between said lines male pins or uncut peak areas having heights between about 0.001 and 0.0025 inch. Random-engraved or sandblasted embossing rolls produce a matte surface on the film but the appearance and functional properties thereof are minimized or degraded during the orientation or tentering step, so that the final film has a high-gloss surface which does not have the appearance or feel of cloth and has high blocking or adhesion properties.

An apparent explanation for the unexpected advantages obtained from the use of the present geometric embossing rolls in the present process is that a geometric embossing surface comprising geometrically-aligned pins or peak areas forms a geometric repetitive pattern of depressions, valleys or recesses in the elastomer surface surrounded by intersecting and connected peak lines, ridges or ribs which provide a skeletal support network during orientation. Such structure uniformly relieves or absorbs the orientation stresses, and the raised portions, peaks, ridges or ribs of the film surface are retained. In other words, the geometric valleys or depressions in the film surface are widened somewhat during orientation while the surrounding raised peak areas, forming the uppermost surface of the film, are stretched and drawn down somewhat so that the film surface retains its embossed appearance and feel and its non-blocking properties.

It is to be understood that the above described embodiments of the invention are illustrative only and that modifications throughout may occur to those skilled in the art. Accordingly, this invention is not to be regarded as limited to the embodiments disclosed herein but is to be limited as defined by the appended claims.

I claim:

1. A geometric-pattern-embossed and oriented, heat-shrinkable, elastic, thermoplastic elastomer film produced by an in-line process, said film comprising at least one thermoplastic elastomer, said thermoplastic elastomer being a blend of an olefinic elastomer, an ethylene copolymer, and a process oil, said thermoplastic elastomer being extrusion-embossed with a geometric micropattern surface comprising between about 50 and 350 lines per inch, each having a depth between about 0.001 and 0.0025 inch and forming a geometric pattern of recessed surface areas and surrounding, intersecting raised surface areas on said film, and said film is oriented in-line in the transverse direction and/or the machine direction to an extent between about 50% and 500%, whereby the film is uniformly stretched in the geometric recessed areas and in the geometric intersecting raised areas of the film, surrounding said recessed areas, whereby said film substantially retains the effects of the embossment, after orientation.

2. A Film according to claim 1 in which said ethylene copolymer comprises an ethylene-vinyl acetate copolymer having a vinyl acetate content from about 9 to about 40 weight percent.

3. A film according to claim 1 in which said thermoplastic elastomer comprises an ethylene-propylene polymer, an ethylene-vinyl acetate copolymer, and hydrocarbon process oil.

4. A film according to claim 1 which comprises
a co-extrudate of least two different extrudable compositions, each comprising at least one thermoplastic elastomer, comprising a core layer of one elastomer composition having high blocking properties and at least one surface layer of a different elastomer composition having lower blocking properties.

5. A film according to claim 4 which comprises said core layer of one elastomer composition, and inner and outer surface layers of said different elastomer composition.

6. A film according to claim 5 which is embossed only on one of said surface layers.

7. A film according to claim 1 in which said embossed geometric micropattern on said film surface comprises between about 100 and 250 lines per inch, each having a depth between about 0.001 and 0.0025 inch.

8. A film according to claim 1 which is stretched only in the transverse direction, and only to an extent between about 200% and 400%.

* * * * *